US009260079B2

(12) United States Patent
Miyazawa (10) Patent No.: US 9,260,079 B2
(45) Date of Patent: Feb. 16, 2016

(54) KEYLESS ENTRY SYSTEM

(71) Applicant: ALPS ELECTRIC CO., LTD., Tokyo (JP)

(72) Inventor: Akira Miyazawa, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 3 days.

(21) Appl. No.: 14/512,985

(22) Filed: Oct. 13, 2014

(65) Prior Publication Data

US 2015/0130589 A1 May 14, 2015

(30) Foreign Application Priority Data

Nov. 12, 2013 (JP) ................................. 2013-234382

(51) Int. Cl.
*G07C 9/00* (2006.01)
*B60R 25/24* (2013.01)

(52) U.S. Cl.
CPC ............ *B60R 25/24* (2013.01); *G07C 9/00309* (2013.01)

(58) Field of Classification Search
CPC .. G07C 9/00; G07C 9/00309; G07C 9/00111; H04B 5/0081; B60R 25/24
USPC ....................... 340/5.61–5.67; 701/2; 307/104
See application file for complete search history.

(56) References Cited

U.S. PATENT DOCUMENTS

| 7,224,980 B2* | 5/2007 | Hara ....................... B60R 25/24 340/10.1 |
| 2005/0162259 A1* | 7/2005 | Hotta .................. B60C 23/0416 340/426.13 |
| 2007/0271014 A1* | 11/2007 | Breed ...................... B60J 10/00 701/31.9 |
| 2008/0055042 A1* | 3/2008 | Okada ................. B60R 25/2072 340/5.61 |
| 2008/0088409 A1* | 4/2008 | Okada ................ G07C 9/00309 340/5.2 |
| 2012/0239571 A1* | 9/2012 | Boot .................... B60L 11/1816 705/44 |
| 2015/0061830 A1* | 3/2015 | Yamane ............. G07C 9/00111 340/5.64 |

FOREIGN PATENT DOCUMENTS

JP 2006-16928 1/2006

* cited by examiner

*Primary Examiner* — Allen T Cao
(74) *Attorney, Agent, or Firm* — Beyer Law Group LLP (57) ABSTRACT

A keyless entry system includes an on-vehicle unit and a mobile device, and controls on-vehicle equipment using a wakeup signal and a command signal. The on-vehicle unit radio-transmits a first transmission signal including the wakeup signal and a second transmission signal relating to the detection of an interference wave to the first transmission signal to the mobile device using radio signals having different frequencies. When the first transmission signal has been normally received, the mobile device radio-transmits a third transmission signal including the command signal to the on-vehicle unit and receives a second transmission signal. When the first transmission signal could not be normally received, the mobile device performs the detection of the interference wave to the first transmission signal and radio-transmits a fourth transmission signal for requesting the retransmission of the first transmission signal to the on-vehicle unit.

4 Claims, 7 Drawing Sheets

KEYLESS ENTRY SYSTEM

CLAIM OF PRIORITY

This application claims benefit of Japanese Patent Application No. 2013-234382 filed on Nov. 12, 2013, which is hereby incorporated by reference.

BACKGROUND OF THE INVENTION

1. Field of the Invention

The present invention relates to a keyless entry system, and in particular, a keyless entry system capable of reducing the influence of an interference wave.

2. Description of the Related Art

A keyless entry system which can perform vehicle operation, such as locking and unlocking of the doors of the vehicle, through radio communication between an on-vehicle unit mounted in a vehicle and a mobile device carried by a user of the vehicle without using a mechanical key has spread.

Typically, in the keyless entry system, the on-vehicle unit transmits a radio signal having a frequency (30 kHz to 300 kHz) in a low frequency (LF) band to the mobile device, and the mobile device transmits a radio signal having a frequency (300 MHz to 3 GHz) in an ultrahigh frequency (UHF) band to the on-vehicle unit corresponding to the radio signal having a frequency in the LF band, whereby radio communication can be performed between the on-vehicle unit and the mobile device. Then, a wakeup signal for activating a predetermined function of the mobile device is radio-transmitted from the on-vehicle unit to the mobile device through radio communication between the on-vehicle unit and the mobile device, and a command signal relating to vehicle operation is radio-transmitted from the mobile device to the on-vehicle unit corresponding to the wakeup signal. In the keyless entry system, in this way, on-vehicle equipment, such as a door locking device, is controlled using the wakeup signal radio-transmitted from the on-vehicle unit to the mobile device and the command signal radio-transmitted from the mobile device to the on-vehicle unit corresponding to the wakeup signal, thereby performing vehicle operation, such as locking and unlocking of the doors of the vehicle.

On the other hand, when the mobile device of the keyless entry system is carried along with another electronic apparatus, such as a mobile information terminal, an interference wave (noise) in an LF band generated from a display device, a drive circuit, or the like of the electronic apparatus affects the mobile device, and may interfere with the reception of the radio signal in the LF band radio-transmitted from the on-vehicle unit. Then, the mobile device cannot normally receive the radio signal in the LF band due to the influence of the interference wave generated by the electronic apparatus, and the on-vehicle unit may not reliably transfer the wakeup signal to the mobile device. For this reason, it is possible to reduce the influence of the interference wave generated by another electronic apparatus.

Figure 7A:
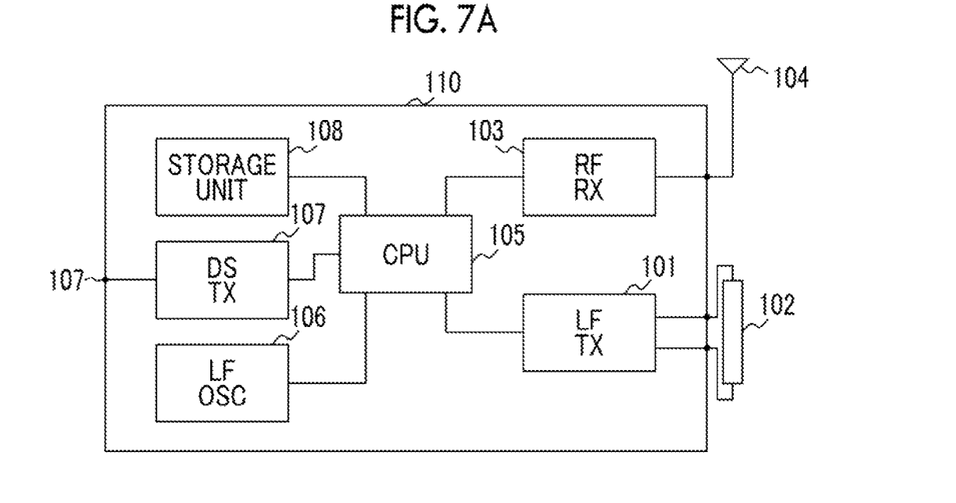
FIGS. 7A and 7B are explanatory views showing the configuration of a passive keyless entry device 100 described in Japanese Unexamined Patent Application Publication No. 2006-16928.
Figure 7B:
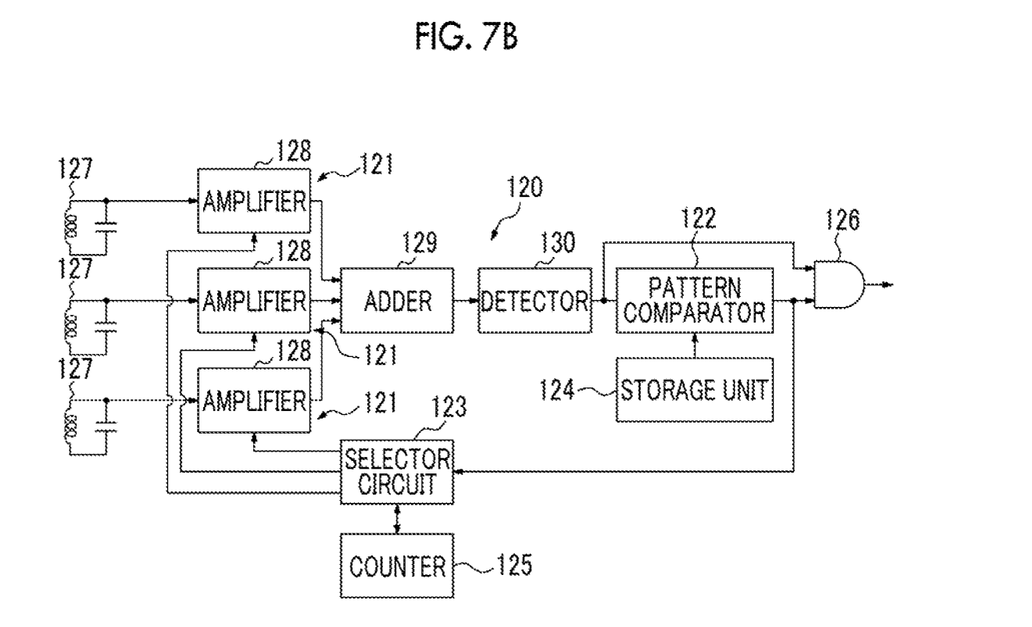

As a keyless entry system capable of reducing the influence of the interference wave generated by another electronic apparatus, a passive keyless entry device (keyless entry system) described in Japanese Unexamined Patent Application Publication No. 2006-16928 or the like has been suggested. FIGS. 7A and 7B are explanatory views showing the configuration of a passive keyless entry device 100 described in Japanese Unexamined Patent Application Publication No. 2006-16928. FIG. 7A shows an on-vehicle transceiver 110 (on-vehicle unit) and FIG. 7B shows a mobile transceiver 120 (mobile device).

As shown in FIGS. 7A and 7B, the passive keyless entry device 100 described in Japanese Unexamined Patent Application Publication No. 2006-16928 includes the on-vehicle transceiver 110 and the mobile transceiver 120. In the passive keyless entry device 100, a first transmission signal including a wakeup signal is radio-transmitted from the on-vehicle transceiver 110, if the mobile transceiver 120 receives the first transmission signal, a second transmission signal including a command signal is radio-transmitted from the mobile transceiver 120, and the on-vehicle transceiver 110 which receives the second transmission signal controls a controlled apparatus (on-vehicle equipment) based on the command signal.

The on-vehicle transceiver 110 has a low frequency signal transmitter 101, a transmission low frequency antenna 102, a high frequency signal receiver 103, a reception high frequency antenna 104, a controller 105, a low frequency oscillator 106, a drive signal transmitter 107, and a storage unit 108. The low frequency signal transmitter 101 radio-transmits the first transmission signal (low frequency signal) including the wakeup signal to the mobile transceiver 120 through the transmission low frequency antenna 102. The high frequency signal receiver 103 receives the second transmission signal from the mobile transceiver 120 through the reception high frequency antenna 104. The controller 105 controls various circuits of the on-vehicle transceiver 110.

The mobile transceiver 120 has three signal reception circuits 121 each having an antenna 127 and an amplifier 128, a pattern comparator 122, a selector circuit 123, a storage unit 124, a counter 125, an AND gate 126, an adder 129, and a detector 130. The three signal reception circuits 121 respectively receive signal components in three orthogonal directions in the first transmission signal. The adder 129 and the detector 130 output a detection signal corresponding to an output signal of each of the three signal reception circuits 121. The pattern comparator 122 and the storage unit 124 perform the detection of the wakeup signal on the detection signal corresponding to the output signal of each of the three signal reception circuits 121.

Then, when the wakeup signal is normally detected (when the first transmission signal could be normally received), the mobile transceiver 120 radio-transmits the second transmission signal including the command signal using transmission means (not shown). When the detection signal from which the wakeup signal cannot be normally detected is obtained (when the first transmission signal could not be normally received), the selector circuit 123 places the signal reception circuit 121 deriving the detection signal in a non-operation state.

In this way, in the passive keyless entry device 100, the three signal reception circuits 121 respectively receive the signal components in the three orthogonal directions in the first transmission signal, thereby receiving the first transmission signal in a direction other than the direction in which the interference wave is generated. Accordingly, it is possible to reduce the influence of the influence wave. When the selector circuit 123 places the signal reception circuits 121, which cannot normally receive the signal components of the first transmission signal, in a non-operation state, thereby suppressing an increase in power consumption of the mobile transceiver 120 accompanied by reduction in the influence of the interference wave.

However, in the passive keyless entry device 100 described in Japanese Unexamined Patent Application Publication No. 2006-16928, a countermeasure against an interference wave is provided only based on whether or not the wakeup signal could be normally detected, that is, whether or not the first transmission signal could be normally received, and it is not necessarily true that the presence/absence of the interference wave or the incoming direction of the interference wave is detected. For this reason, when the interference wave to the first transmission signal is present around the mobile device, and all signal reception circuits 121 could not normally receive the signal components of the first transmission signal, it is not possible to provide an effective countermeasure against an interference wave, and it may not be possible to reliably transfer the wakeup signal.

SUMMARY OF THE INVENTION

The invention provides a keyless entry system capable of reducing the influence of an interference wave to a first transmission signal.

A keyless entry system according to an aspect of the invention includes an on-vehicle unit which is mounted in a vehicle, and a mobile device which is able to perform radio communication with the on-vehicle unit. The keyless entry system controls on-vehicle equipment mounted in the vehicle using a wakeup signal radio-transmitted from the on-vehicle unit to the mobile device, and a command signal radio-transmitted from the mobile device to the on-vehicle unit corresponding to the wakeup signal. The on-vehicle unit radio-transmits a first transmission signal including the wakeup signal and a second transmission signal relating to the detection of an interference wave to the first transmission signal to the mobile device using radio signals having different frequencies. When the first transmission signal has been normally received, the mobile device radio-transmits a third transmission signal including the command signal to the on-vehicle unit and receives the second transmission signal, and when the first transmission signal has not been normally received, the mobile device performs the detection of an interference wave to the first transmission signal corresponding to the second transmission signal, and radio-transmits a fourth transmission signal for requesting the on-vehicle unit to retransmit the first transmission signal to the on-vehicle unit.

In the keyless entry system having the above-described configuration, the on-vehicle unit radio-transmits the first transmission signal including the wakeup signal and the second transmission signal for instructing the mobile device to detect the reception electric field intensity to the mobile device using the radio signals having different frequencies. For this reason, even when the interference wave to the first transmission signal is present around the mobile device and the mobile device could not normally receive the first transmission signal, it is possible to transfer an instruction from the on-vehicle unit to the mobile device using the second transmission signal. In addition, when the second transmission signal is received and the first transmission signal could not be normally received, the mobile device performs the detection of the interference wave to the first transmission signal corresponding to the second transmission signal and radio-transmits the fourth transmission signal for requesting the on-vehicle unit to retransmit the first transmission signal to the on-vehicle unit. For this reason, the detection of the interference wave to the first transmission signal is performed corresponding to the second transmission signal, whereby it is possible to provide an effective countermeasure against an interference wave. The mobile device radio-transmits the fourth transmission signal to the on-vehicle unit and the on-vehicle unit retransmits the first transmission signal corresponding to the fourth transmission signal, whereby it is possible to increase reliability of radio transmission of the first transmission signal from the on-vehicle unit to the mobile device. As a result, in the keyless entry system having the above-described configuration, it is possible to further reduce the influence of the interference wave to the first transmission signal.

In the keyless entry system according to the aspect of the invention, the on-vehicle unit may include first transmission means for radio-transmitting the first transmission signal, second transmission means for radio-transmitting the second transmission signal, and third reception means for receiving the third transmission signal and the fourth transmission signal. The mobile device includes three first reception means for receiving signal components in three orthogonal directions in the first transmission signal, second reception means for receiving the second transmission signal, third transmission means for radio-transmitting the third transmission signal and the fourth transmission signal, electric field intensity detection means for detecting reception electric field intensity of the signal components received by the three first reception means corresponding to the second transmission signal, interference wave detection means for performing the detection of an interference wave to the signal components based on reception electric field intensity detected by the electric field intensity detected by the electric field intensity detection means, reception selection means for placing the first reception means, which receives the signal components including the detected interference wave, in a non-operation state, and control means for controlling the third transmission means, the electric field intensity detection means, the interference wave detection means, and the reception selection means.

In the keyless entry system having the above-described configuration, when the interference wave to the first transmission signal is present around the mobile device, it is possible to detect the interference wave or to specify the incoming direction of the interference wave using the three first reception means, the electric field intensity detection means, and the interference wave detection means. Then, even if the interference wave to the first transmission signal is present around the mobile device, the reception selection means places the first reception means, which receives the signal components including the detected interference wave, in the non-operation state, whereby it is possible to suppress the reception of a radio signal from the incoming direction of the interference wave and to facilitate the normal reception of the first transmission signal. Thereafter, the first transmission signal is retransmitted, whereby it is possible to further increase reliability of radio transmission of the first transmission signal from the on-vehicle unit to the mobile device.

In the keyless entry system according to the aspect of the invention, the interference wave detection means may determine that an interference wave is present around the mobile device when the reception electric field intensity detected by the electric field intensity detection means is equal to or greater than a prescribed value within a predetermined time and the first transmission signal is unable to be normally received.

In the keyless entry system having the above-described configuration, the presence/absence of the interference wave to the first transmission signal is determined using two kinds of information regarding the reception electric field intensity detected by the electric field intensity detection means and whether or not the first transmission signal could be normally received. For this reason, it is possible to more accurately determine the presence/absence of the interference wave to the first transmission signal.

In the keyless entry system according to the aspect of the invention, the first transmission signal may be radio-transmitted using a radio signal having a frequency in a low frequency band, and the second transmission signal may be radio-transmitted using a radio signal having a frequency in an ultrahigh frequency band.

In the keyless entry system having the above-described configuration, the first transmission signal is radio-transmitted using the radio signal having a frequency in the low frequency band, and the second transmission signal is radio-transmitted using the radio signal having a frequency in the ultrahigh frequency band. The radio signal having a frequency in the ultrahigh frequency band is significantly different in frequency from the radio signal having a frequency in the low frequency band, and is thus hardly affected by the interference wave to the radio signal having a frequency in the low frequency band. For this reason, even when the interference wave to the first transmission signal is present around the mobile device, it is possible to increase reliability of radio communication of the second transmission signal from the on-vehicle unit to the mobile device.

DESCRIPTION OF THE PREFERRED EMBODIMENTS

Hereinafter, an embodiment of the invention will be described referring to the drawings. In the respective drawings, description will be provided while an X1 direction is referred to as a left direction, an X2 direction is referred to as a right direction, a Y1 direction is referred to as a forward direction, a Y2 direction is referred to as a backward direction, a Z1 direction is referred to as an upward direction, and a Z2 direction is referred to as a downward direction.

Figure 1:
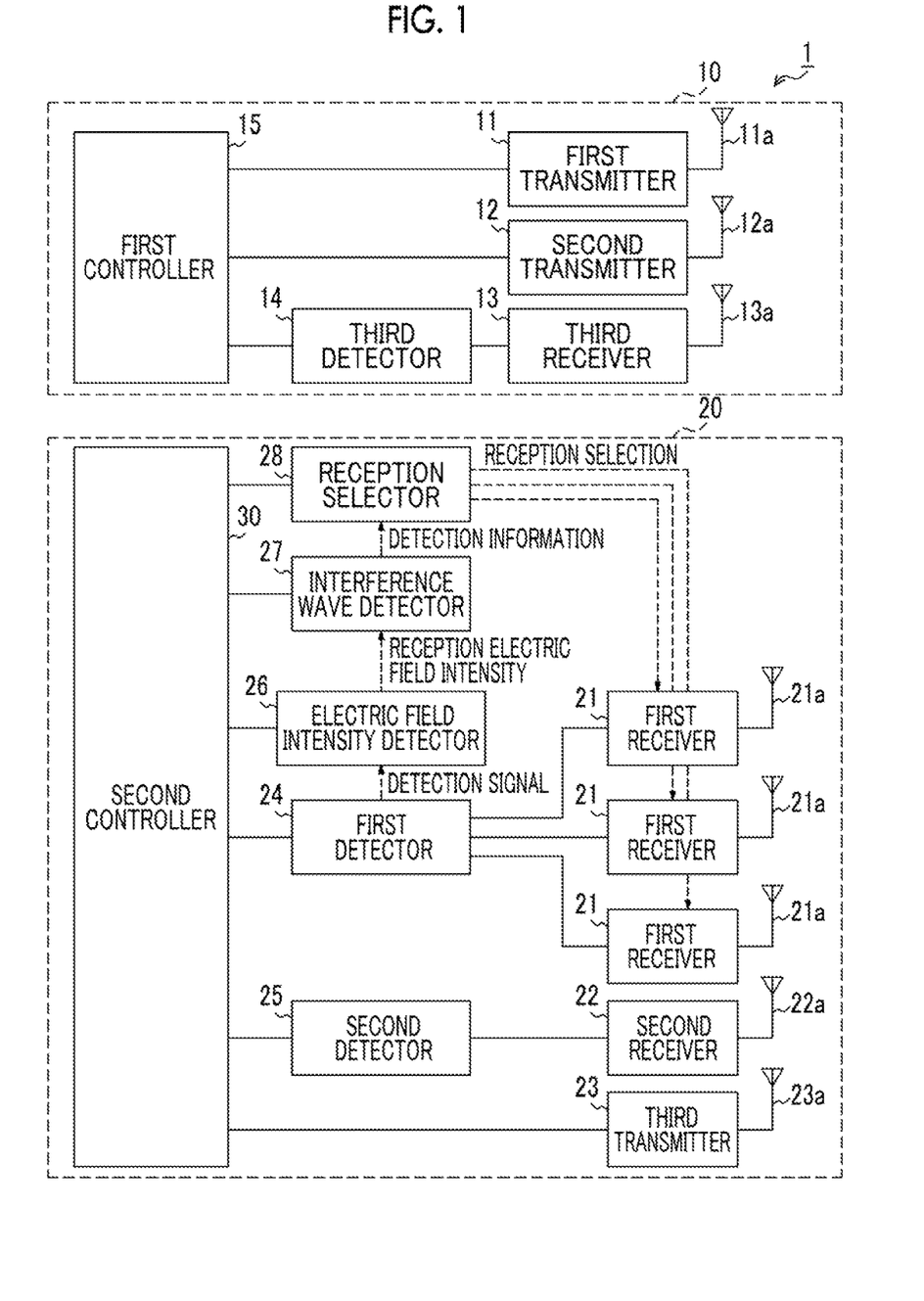
FIG. 1 is a block diagram showing the configuration of a keyless entry system 1 according to an embodiment of the invention.
Figure 2:
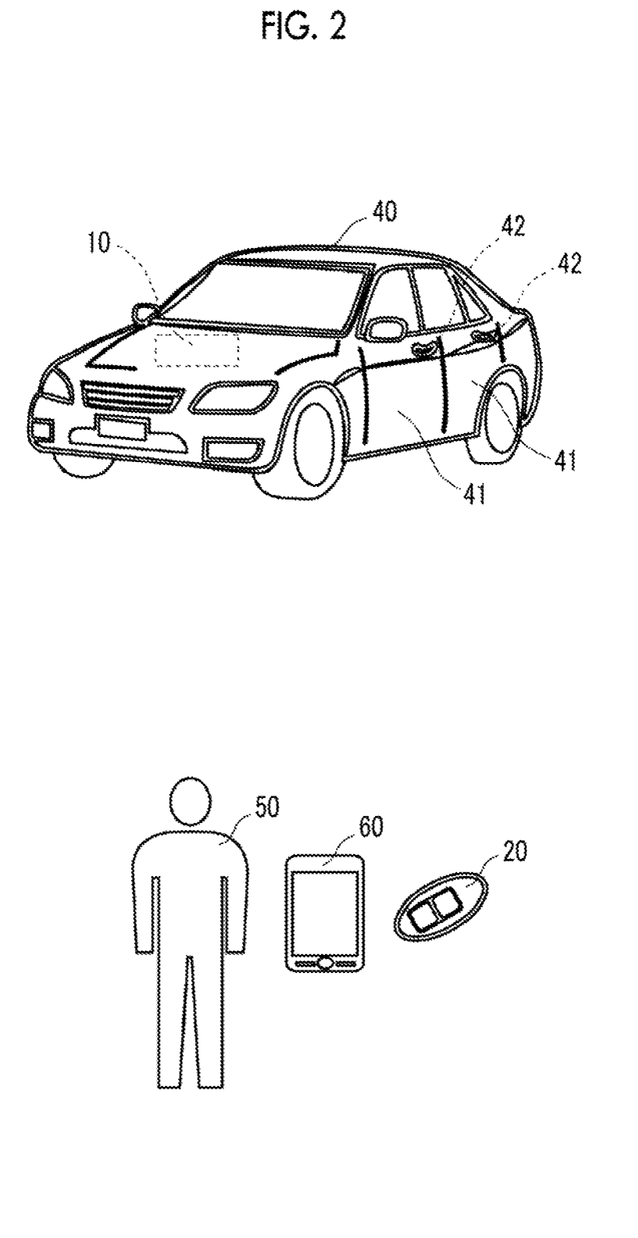
FIG. 2 is an explanatory view showing a use example of the keyless entry system 1 shown in FIG. 1.
Figure 3A:
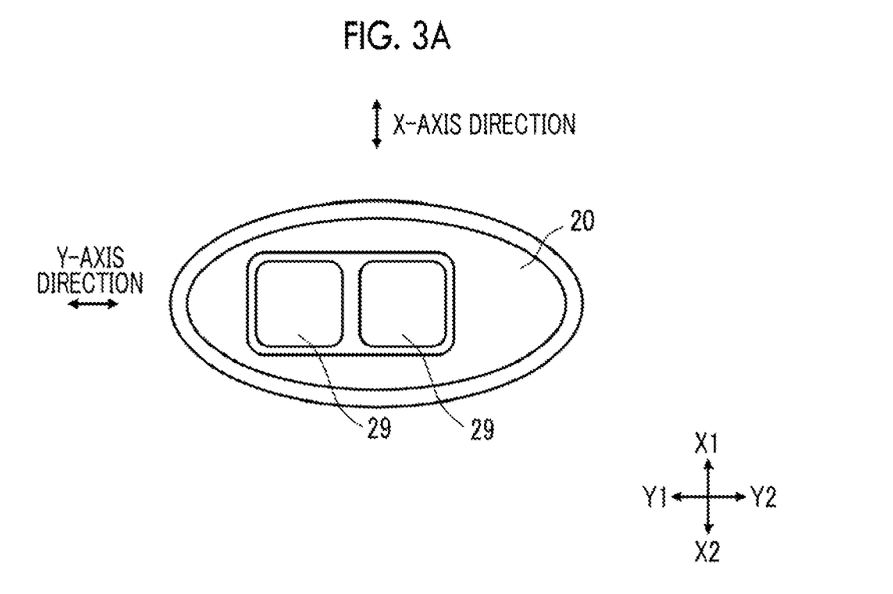
FIGS. 3A and 3B are explanatory views showing the configuration of the mobile device 20 shown in FIG. 1.
Figure 3B:
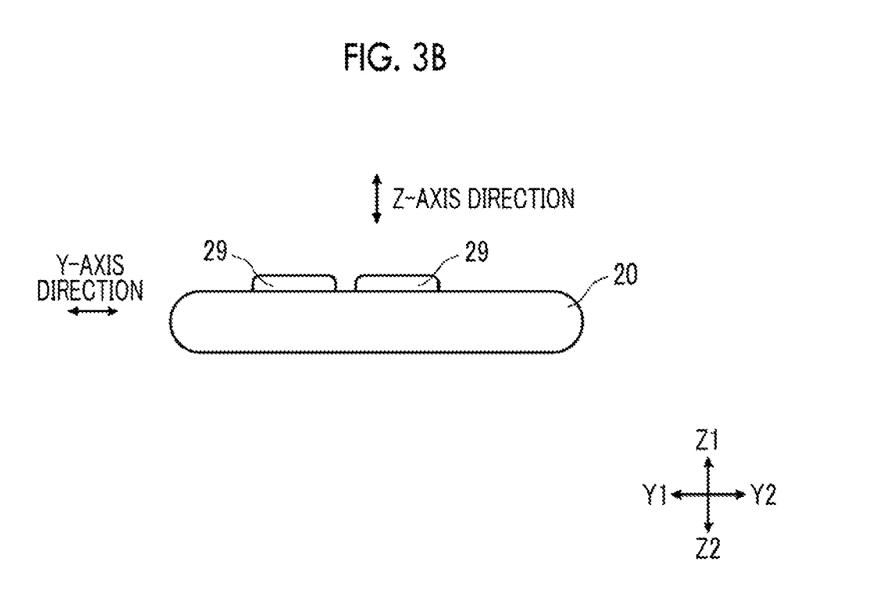

First, the configuration of a keyless entry system 1 according to the embodiment of the invention will be described referring to FIGS. 1 to 3A and 3B. FIG. 1 is a block diagram showing the configuration of the keyless entry system 1 according to the embodiment of the invention. FIG. 2 is an explanatory view showing a use example of the keyless entry system 1 shown in FIG. 1. FIGS. 3A and 3B are explanatory views showing the configuration of a mobile device 20 shown in FIG. 1. FIG. 3A is a top view and FIG. 3B is a side view.

As shown in FIG. 1, the keyless entry system 1 includes an on-vehicle unit 10 and a mobile device 20. As shown in FIG. 2, the on-vehicle unit 10 is mounted in a vehicle 40. The vehicle 40 is mounted with on-vehicle equipment, such as a door locking device 42 which performs locking and unlocking of doors 41 of the vehicle 40. The mobile device 20 is carried by a user 50 of the vehicle 40 along with an electronic apparatus 60, such as a mobile information terminal, called a smartphone. The on-vehicle unit 10 and the mobile device 20 can perform radio communication. Then, in the keyless entry system 1, on-vehicle equipment, such as the door locking device 42, is controlled through radio communication between the on-vehicle unit 10 and the mobile device 20, and vehicle operation, such as locking and unlocking of the doors 41 of the vehicle 40, can be performed without using a mechanical key.

The on-vehicle unit 10 is connected to an on-vehicle battery (not shown), and the on-vehicle battery supplies power to various circuits of the on-vehicle unit 10. A battery (not shown) is embedded in the mobile device 20, and the embedded battery supplies power to various circuits of the mobile device 20.

Next, the configuration of the on-vehicle unit 10 will be described. As shown in FIG. 1, the on-vehicle unit 10 has a first transmitter 11 (first transmission means), a second transmitter 12 (second transmission means), a third receiver 13 (third reception means), a third detector 14, and a first controller 15.

A first transmission antenna 11a is connected to the first transmitter 11. The first transmitter 11 radio-transmits a first radio signal, which is a radio signal (electromagnetic signal) having a frequency (30 kHz to 300 kHz) in a low frequency band (LF band), to the mobile device 20 through the first transmission antenna 11a. As the first radio signal, a radio signal having a frequency in a 120 kHz band or the like is used. Then, modulation, such as AM modulation, is applied to the first radio signal, whereby various instructions or information can be transferred from the on-vehicle unit 10 to the mobile device 20. The range of the first radio signal is limited to the inside of the vehicle 40 and the vicinity of the doors 41 of the vehicle 40.

A second transmission antenna 12a is connected to the second transmitter 12. The second transmitter 12 radio-transmits a second radio signal, which is a radio signal (electromagnetic signal) having a frequency (300 MHz to 3 GHz) in an ultrahigh frequency band (UHF band), to the mobile device 20 through the second transmission antenna 12a. As the second radio signal, a radio signal having a frequency in a 2.4 GHz band or the like is used. Then, modulation, such as FM modulation, is applied to the second radio signal, whereby various instructions or information can be transferred from the on-vehicle unit 10 to the mobile device 20. The range of the second radio signal is about several m from the vehicle 40.

A third reception antenna 13a is connected to the third receiver 13. The third receiver 13 receives a third radio signal, which is a radio signal (electromagnetic signal) having a frequency in a UHF band radio-transmitted from the mobile device 20, through the third reception antenna 13a. As the third radio signal, a radio signal having a frequency in a 300 MHz band or the like is used. Then, modulation, such as FM modulation, is applied to the third radio signal, whereby various instructions or information can be transferred from the mobile device 20 to the on-vehicle unit 10. The range of the second radio signal is about several m from the mobile device 20.

The third detector 14 is connected to the third receiver 13. The third detector 14 detects an output signal of the third receiver 13 and detects various instructions or information included as a modulation component of the third radio signal. A detection signal of the third detector 14 is transferred to the first controller 15.

The first controller 15 controls the first transmitter 11 and the second transmitter 12. The first controller 15 obtains an instruction or information relating to vehicle operation from the detection signal of the third detector 14. The first controller 15 is connected to on-vehicle equipment, such as the door locking device 42, through an on-vehicle network (not shown) and controls on-vehicle equipment, such as the door locking device 42, based on the instruction obtained from the detection signal of the third detector 14.

Next, the configuration of the mobile device 20 will be described. As shown in FIG. 1, the mobile device 20 has three first receivers 21 (first reception means), a second receiver 22 (second reception means), a third transmitter 23 (third transmission means), a first detector 24, a second detector 25, an electric field intensity detector 26 (electric field intensity detection means), an interference wave detector 27 (interference wave detection means), a reception selector 28 (reception selection means), and a second controller 30 (control means). As shown in FIGS. 3A and 3B, the mobile device 20 has two operation switches 29.

First reception antennas 21a are respectively connected to the three first receivers 21. The three first reception antennas 21a respectively have directivity to three orthogonal directions (in FIGS. 3A and 3B, an X-axis direction, a Y-axis direction, and a Z-axis direction). The three first receivers 21 respectively receive signal components in the three orthogonal directions (in FIGS. 3A and 3B, the X-axis direction, the Y-axis direction, and the Z-axis direction) in the first radio signal through the first reception antennas 21a.

A second reception antenna 22a is connected to the second receiver 22. The second receiver 22 receives the second radio signal radio-transmitted from the mobile device 20 through the second reception antenna 22a.

A third transmission antenna 23a is connected to the third transmitter 23. The third transmitter 23 radio-transmits the third radio signal to the on-vehicle unit 10 through the third transmission antenna 23a.

The first detector 24 is connected to the three first receivers 21. The first detector 24 detects an output signal of each of the three first receivers 21 and detects various instructions or information included as a modulation component of the first radio signal. Detection signals of the first detector 24 are transferred to the second controller 30. Some of the detection signals of the first detector 24 are also transferred to the electric field intensity detector 26.

The second detector 25 is connected to the second receiver 22. The second detector 25 detects an output signal of the second receiver 22 and detects various instructions or information included as a modulation component of the second radio signal. A detection signal of the second detector 25 is transferred to the second controller 30.

The electric field intensity detector 26 detects the reception electric field intensity of the signal components received by the three first receivers 21 based on the detection signals of the first detector 24. Information relating to the reception electric field intensity detected by the electric field intensity detector 26 is transferred to the interference wave detector 27.

The interference wave detector 27 performs the detection of an interference wave to the signal components received by the three first receivers 21 based on the reception electric field intensity detected by the electric field intensity detector 26. When the interference wave is detected, the interference wave detector 27 specifies the incoming direction of the interference wave based on the reception electric field intensity detected by the electric field intensity detector 26. Detection information of the interference wave is transferred to the reception selector 28.

The reception selector 28 places the first receivers 21, which receive the signal components including the detected interference wave, among the three first receivers 21 in a non-operation state based on information transferred from the interference wave detector 27. The first receivers 21 can be placed in the non-operation state by a method in which power supply to amplification circuits (not shown) of the first receivers 21 is stopped, or the like.

The two operation switches 29 are operation switches for instructing locking and unlocking of the doors 41 of the vehicle 40. As shown in FIGS. 3A and 3B, the two operation switches 29 are arranged to be press-operable at a predetermined position on the upper surface of the mobile device 20.

The second controller 30 controls the third transmitter 23, the electric field intensity detector 26, the interference wave detector 27, and the reception selector 28. The second controller 30 obtains various instructions or information from the detection signals of the first detector 24 and the detection signal of the second detector 25 and performs various kinds of determination based on the obtained instructions or information. The second controller 30 monitors the two operation switches 29.

Next, a communication function of the keyless entry system 1 will be described. In the keyless entry system 1, the first transmitter 11 of the on-vehicle unit 10 radio-transmits the first radio signal, and the first receivers 21 of the mobile device 20 receive the first radio signal, whereby various instructions or information can be transferred from the on-vehicle unit 10 to the mobile device 20. In this embodiment, a first transmission signal including a wakeup signal or the like is radio-transmitted from the on-vehicle unit 10 using the first radio signal.

The wakeup signal is a signal for activating a predetermined function of the mobile device 20. Typically, when the mobile device 20 is not used, a majority of functions of the mobile device 20 excluding some functions, such as a reception function, are stopped (sleep state). When the first transmission signal including the wakeup signal is received from the on-vehicle unit 10, the mobile device 20 operates the functions being stopped and can perform radio communication with the on-vehicle unit 10 (wakeup state).

In the keyless entry system 1, the second transmitter 12 of the on-vehicle unit 10 radio-transmits the second radio signal, and the second receiver 22 of the mobile device 20 receives the second radio signal, whereby various instructions or information can be transferred from the on-vehicle unit 10 to the mobile device 20. In this embodiment, a second transmission signal for instructing the electric field intensity detector 26 of the mobile device 20 to detect the reception electric field intensity or the like is radio-transmitted from the on-vehicle unit 10 using the second radio signal. The second transmission signal is radio-transmitted simultaneously with the first transmission signal when the first transmission signal is radio-transmitted using the first radio signal.

In the keyless entry system 1, the third transmitter 23 of the mobile device 20 radio-transmits the third radio signal, and the third receiver 13 of the on-vehicle unit 10 receives the third radio signal, whereby various instructions or information can be transferred from the mobile device 20 to the on-vehicle unit 10. In this embodiment, a third transmission signal including a command signal, a fourth transmission signal for requesting the on-vehicle unit 10 to retransmit the first transmission signal, or the like is radio-transmitted from the mobile device 20 using the third radio signal.

The command signal is a signal for performing an instruction relating to vehicle operation, such as locking and unlocking of the doors 41 of the vehicle 40. For example, when the mobile device 20 has normally received the first transmission signal, the third transmission signal including the command signal corresponding to the wakeup signal included in the first transmission signal is radio-transmitted from the mobile device 20. Even when the operation switches 29 of the mobile device 20 are press-operated, the third transmission signal including a command signal corresponding to press-operation is radio-transmitted from the mobile device 20.

The fourth transmission signal is radio-transmitted from the mobile device 20 corresponding to the second transmission signal when the mobile device 20 receives the second transmission signal and the first transmission signal could not be normally received.

Next, vehicle operation according to this embodiment will be described. In the keyless entry system 1, vehicle operation, such as locking and unlocking of the doors 41 of the vehicle 40, is performed through radio communication between the on-vehicle unit 10 and the mobile device 20.

Unlocking of the doors 41 of the vehicle 40 is automatically performed when the user 50 carries the mobile device 20 and approaches the vehicle 40. In this embodiment, the on-vehicle unit 10 radio-transmits the first transmission signal including the wakeup signal, the mobile device 20 radio-transmits a third transmission signal corresponding to the wakeup signal, and when the on-vehicle unit 10 receives the third transmission signal, it is determined that the user 50 approaches the vehicle 40.

Locking of the doors 41 of the vehicle 40 is automatically performed when the user 50 carries the mobile device 20 and moves away from the vehicle 40. In this embodiment, even if the on-vehicle unit 10 radio-transmits the first transmission signal including the wakeup signal after the user 50 gets out of the vehicle 40, when the mobile device 20 has not radio-transmitted the third transmission signal corresponding to the wakeup signal, it is determined that the user 50 moves away from the vehicle 40.

As described above, the first transmission signal is radio-transmitted using the first radio signal which is the radio signal having a frequency in the LF band. The range of the first radio signal is limited to the inside of the vehicle 40 and the vicinity of the doors 41 of the vehicle 40. For this reason, it is possible to perform determination about whether or not the user 50 approaches the vehicle 40 and whether or not the user 50 moves away from the vehicle 40 through radio communication between the on-vehicle unit 10 and the mobile device 20 using the first radio signal and third radio signal.

In this embodiment, in this way, vehicle operation, such as locking and unlocking of the doors 41 of the vehicle 40, is performed through radio communication between the on-vehicle unit 10 and the mobile device 20. In this embodiment, although the operation switches 29 of the mobile device 20 are press-operated to perform locking and unlocking of the doors 41 of the vehicle 40, detailed description of a method for vehicle operation will be omitted.

Figure 4:
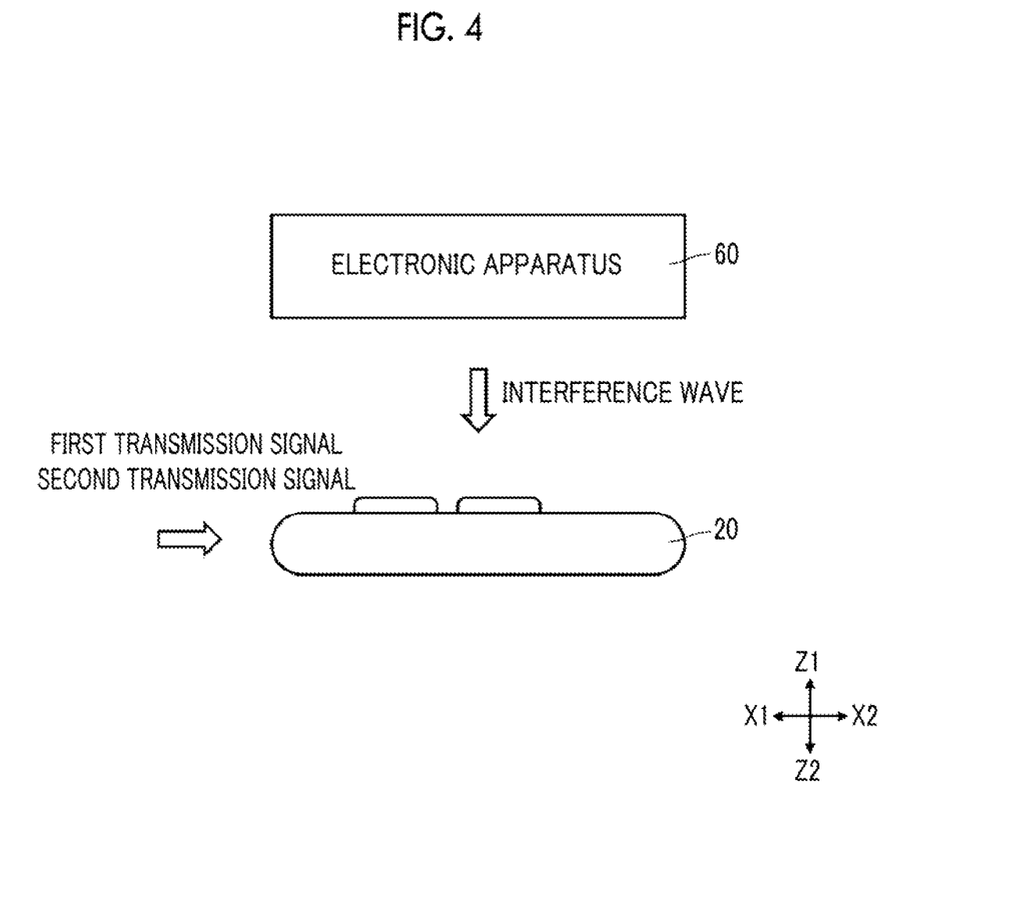
FIG. 4 is an explanatory view schematically showing a use state of the mobile device 20 shown in FIG. 1.

Next, a countermeasure against an interference wave according to this embodiment will be described referring to FIG. 4. FIG. 4 is an explanatory view schematically showing a use state of the mobile device 20 shown in FIG. 1.

FIG. 4 shows a use example where the user 50 stands on the right side of the vehicle 40 while holding the mobile device 20 and the electronic apparatus 60 such that the electronic apparatus 60 is positioned above the mobile device 20, and then, the mobile device 20 waits for the first transmission signal from the on-vehicle unit 10 incoming from the left side of the mobile device 20.

The electronic apparatus 60 is an electronic apparatus, such as a mobile information terminal, called a smartphone, and an interference wave (noise) having a frequency in an LF band is generated from a display device, a drive circuit, or the like of the electronic apparatus 60. For this reason, the mobile device 20 is affected by the interference wave of the electronic apparatus 60 incoming from above the mobile device 20. When the mobile device 20 and the electronic apparatus 60 are held close to each other, the mobile device 20 may not normally receive the first transmission signal due to the influence of the interference wave of the electronic apparatus 60. Hereinafter, the interference wave is referred to as the interference wave to the first transmission signal.

As a countermeasure against the interference wave to the first transmission signal, in the keyless entry system 1, the on-vehicle unit 10 radio-transmits the first transmission signal including the wakeup signal to the mobile device 20 and radio-transmits the second transmission signal to the mobile device 20. For this reason, even when the interference wave to the first transmission signal is present around the mobile device 20, and the mobile device 20 could not normally receive the first transmission signal, an instruction or information can be transferred from the on-vehicle unit 10 to the mobile device 20 using the second transmission signal.

In the mobile device 20, when the second transmission signal is received and the first transmission signal could not be normally received, the electric field intensity detector 26 detects the reception electric field intensity of the signal components received by the three first receivers 21 corresponding to the second transmission signal. The interference wave detector 27 performs the detection of the interference wave to the signal components received by the three first receivers 21 based on the reception electric field intensity detected by the electric field intensity detector 26.

When the interference wave detector 27 detects the interference wave, the interference wave detector 27 specifies the incoming direction of the interference wave based on the reception electric field intensity detected by the electric field intensity detector 26. The reception selector 28 places the first receivers 21, which receive the signal components including the detected interference wave, among the three first receivers 21 in the non-operation state, whereby it is possible to suppress the reception of a radio signal from the incoming direction of the interference wave and to facilitate the normal reception of the first transmission signal. Hereinafter, placing the first receivers 21, which receive the signal components including the detected interference wave, in the non-operation state is referred to as performing reception selection.

Thereafter, the third transmitter 23 of the mobile device 20 radio-transmits the fourth transmission signal to the on-vehicle unit 10 corresponding to the second transmission signal. The first transmitter 11 of the on-vehicle unit 10 retransmits the first transmission signal corresponding to the fourth transmission signal. In the keyless entry system 1, in this way, a countermeasure against the interference wave to the first transmission signal is provided.

In the detection of the interference wave to the first transmission signal, the interference wave detector 27 determines that the interference wave is present around the mobile device 20 when the reception electric field intensity detected by the electric field intensity detector 26 is equal to or greater than a prescribed value within a predetermined time and the first transmission signal is unable to be normally received. In this way, the determination is performed using two kinds of information regarding reception electric field intensity detected by the electric field intensity detector 26 and whether or not the first transmission signal could be normally received, whereby precision of the determination about the presence/absence of the interference wave to the first transmission signal is increased.

In specifying the incoming direction of the interference wave, the interference wave detector 27 specifies, as the incoming direction of the interference wave, the direction corresponding to the signal component including the detected interference wave, that is, the signal component for which the reception electric field intensity equal to or greater than the prescribed value is detected.

Figure 5:
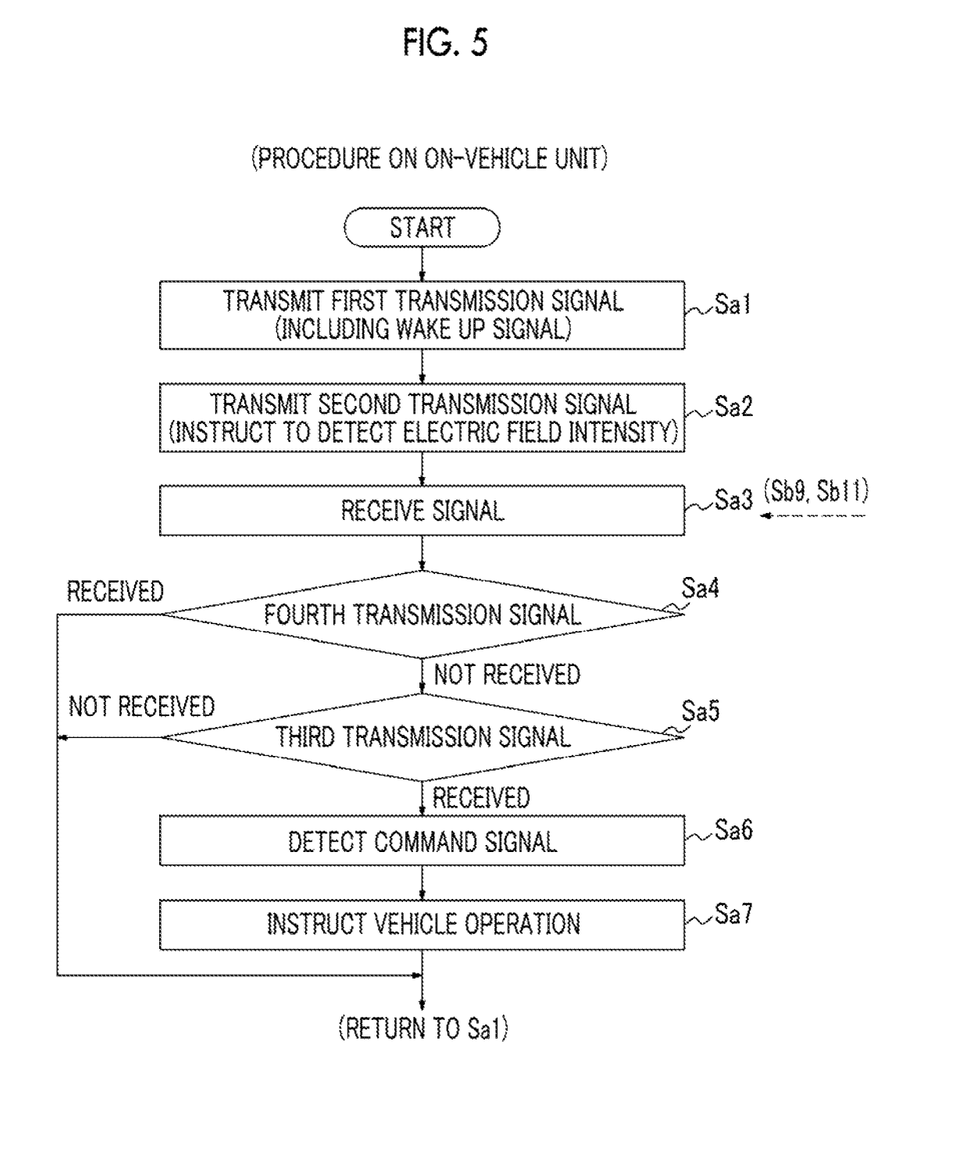
FIG. 5 is a first flowchart showing a communication procedure on an on-vehicle unit 10 side according to the embodiment of the invention.
Figure 6:
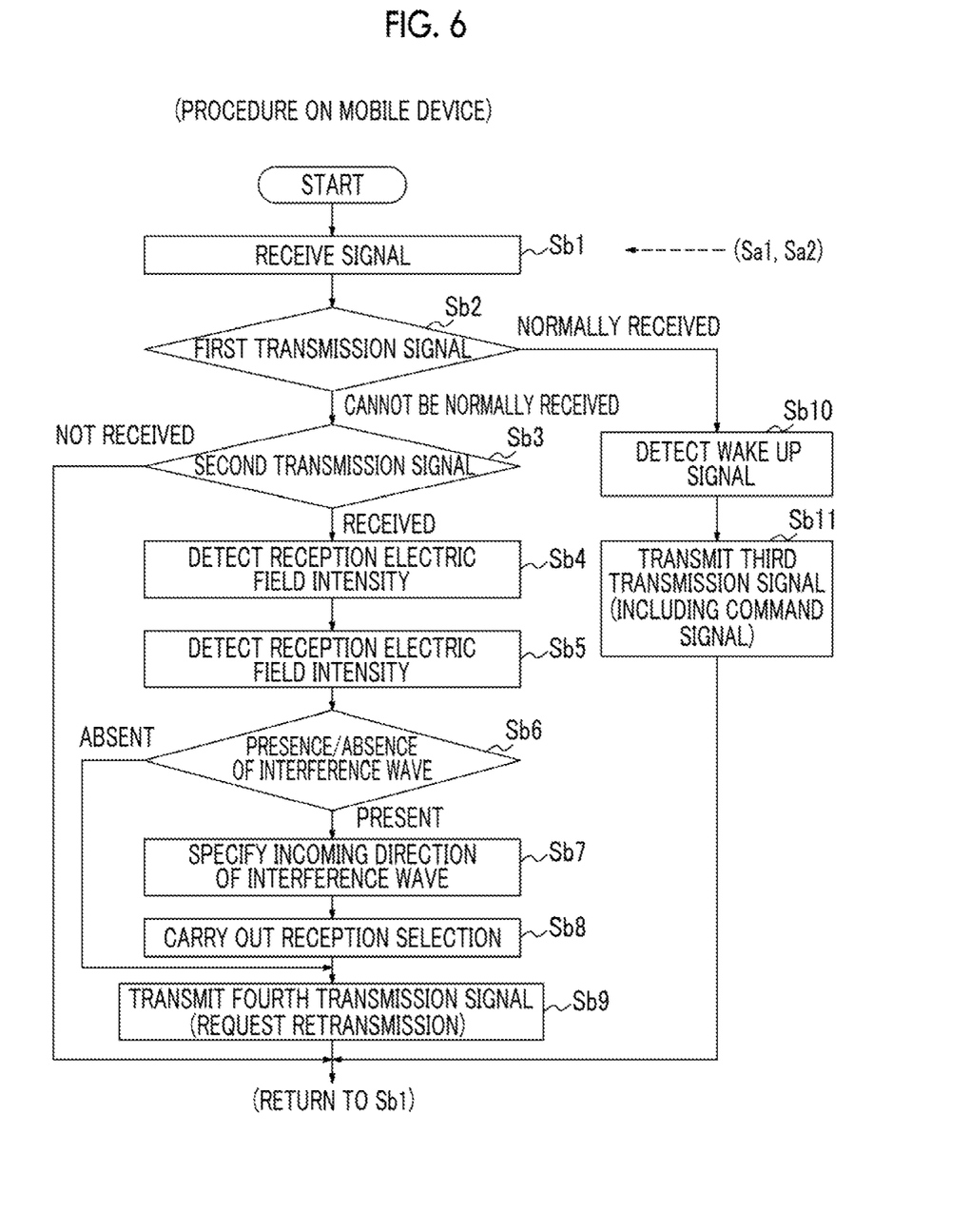
FIG. 6 is a second flowchart showing a communication procedure on a mobile device 20 side according to the embodiment of the invention.

Next, a communication procedure according to this embodiment will be described referring to FIGS. 5 and 6. FIG. 5 is a first flowchart showing a communication procedure on the on-vehicle unit 10 side according to the embodiment of the invention. FIG. 6 is a second flowchart showing a communication procedure on the mobile device 20 side according to the embodiment of the invention.

As shown in FIGS. 5 and 6, first, in the on-vehicle unit 10, the first transmitter 11 radio-transmits the first transmission signal including the wakeup signal (Step Sa1). Simultaneously, the second transmitter 12 radio-transmits the second transmission signal for instructing the detection of the reception electric field intensity (Step Sa2). Radio transmission of the first transmission signal and radio transmission of the second transmission signal are substantially simultaneously performed.

Corresponding to Step Sa1 and Step Sa2, in the mobile device 20, the first receivers 21 and the second receiver 22 wait for a signal radio-transmitted from the on-vehicle unit 10 (Step Sb1). The second controller 30 performs determination based on whether or not the first transmission signal has been normally received (Step Sb2).

In Step Sb2, when the first receivers 21 have normally received the first transmission signal, the process progresses to Step Sb10. In Step Sb2, when the first receivers 21 could not normally receive the first transmission signal, the second controller 30 performs determination based on the presence/absence of the reception of the second transmission signal (Step Sb3).

In Step Sb3, when the second receiver 22 has not received the second transmission signal, the process returns to Step Sb1, and the procedure after Step Sb1 is repeated. In Step Sb3, when the second receiver 22 has received the second transmission signal, the electric field intensity detector 26 detects the reception electric field intensity of the signal components in the three directions in the first transmission signal (Step Sb4). The interference wave detector 27 performs the detection of the interference wave to the first transmission signal based on the reception electric field intensity detected by the electric field intensity detector 26 (Step Sb5). The second controller 30 performs determination based on the presence/absence of the interference wave to the first transmission signal (Step Sb6).

In Step Sb6, when the interference wave has not been detected, the process progresses to Step Sb9. In Step Sb6, when the interference wave has been detected, the incoming direction of the interference wave is specified based on the reception electric field intensity detected by the electric field intensity detector 26 (Step Sb7). The reception selector 28 performs reception selection and places the first receivers 21, which receive the signal components including the detected interference wave, in the non-operation state (Step Sb8). As a result, it is possible to suppress the reception of a radio signal from the incoming direction of the interference wave and to facilitate the normal reception of the first transmission signal.

Next, in Step Sb9, the third transmitter 23 radio-transmits the fourth transmission signal for requesting the mobile device 20 to retransmit the first transmission signal. Thereafter, the process returns to Step Sb1, and the procedure after Step Sb1 is repeated.

Corresponding to Step Sb2, in Step Sb10, the first detector 24 detects the wakeup signal from the first transmission signal. The third transmitter 23 radio-transmits the third transmission signal including the command signal corresponding to the wakeup signal (Step Sb11). Thereafter, the process returns to Step Sb1, and the procedure after Step Sb1 is repeated.

Corresponding to Step Sb9 and Step Sb11, in the on-vehicle unit 10, the third receiver 13 waits for a signal radio-transmitted from the mobile device 20 (Step Sa3). Next, the first controller 15 performs determination based on the presence/absence of the reception of the fourth transmission signal from the mobile device 20 (Step Sa4).

In Step Sa4, when the reception of the fourth transmission signal is present, the process returns to Step Sa1, and the procedure after Step Sa1 is repeated. In Step Sa4, when the reception of the fourth transmission signal is absent, the first controller 15 performs determination based on the presence/absence of the reception of the third transmission signal from the mobile device 20 (Step Sa5).

In Step Sa5, when the reception of the third transmission signal is absent within a predetermined time, the process returns to Step Sa1, and the procedure after Step Sa1 is repeated. In Step Sa5, when the reception of the third transmission signal is present, the first controller 15 detects the command signal included in the third transmission signal (Step Sb6). The first controller 15 controls on-vehicle equipment, such as the door locking device 42, based on the detected command signal, and vehicle operation, such as locking and unlocking of the doors 41, is executed (Step Sa7). Thereafter, the process returns to Step Sb1, and the procedure after Step Sb1 is repeated.

In the keyless entry system 1, radio communication is performed between the on-vehicle unit 10 and the mobile device 20 according to the above-described procedure. Vehicle operation, such as locking and unlocking of the doors 41, is performed through radio communication between the on-vehicle unit 10 and the mobile device 20.

Next, the effects of this embodiment will be described. In the keyless entry system 1 of this embodiment, the on-vehicle unit 10 radio-transmits the first transmission signal including the wakeup signal to the mobile device 20 using the first radio signal which is the radio signal having a frequency in the LF band, and radio-transmits the second transmission signal for instructing the mobile device 20 to detect the reception electric field intensity to the mobile device 20 using the second radio signal (the radio signal having a frequency different from the first transmission signal) which is the radio signal having a frequency in the UHF band. For this reason, even when the interference wave to the first transmission signal is present around the mobile device 20, and the mobile device 20 could not normally receive the first transmission signal, an instruction can be transferred from the on-vehicle unit 10 to the mobile device 20 using the second transmission signal.

When the second transmission signal is received and the first transmission signal could not be normally received, the mobile device 20 performs the detection of the interference wave to the first transmission signal corresponding to the second transmission signal, and radio-transmits the fourth transmission signal for requesting the on-vehicle unit 10 to retransmit the first transmission signal to the on-vehicle unit 10. For this reason, the detection of the interference wave to the first transmission signal is performed corresponding to the second transmission signal, whereby it is possible to provide an effective countermeasure against an interference wave. The mobile device 20 radio-transmits the fourth transmission signal to the on-vehicle unit 10, and the on-vehicle unit 10 retransmits the first transmission signal corresponding to the fourth transmission signal, whereby it is possible to increase reliability of radio transmission of the first transmission signal from the on-vehicle unit 10 to the mobile device 20. As a result, in the keyless entry system 1, it is possible to further reduce the influence of the interference wave to the first transmission signal.

In the keyless entry system 1 of this embodiment, when the interference wave to the first transmission signal is present around the mobile device 20, it is possible to detect the interference wave or to specify the incoming direction of the interference wave using the three first receivers 21, the electric field intensity detector 26, and the interference wave detector 27. Even if the interference wave to the first transmission signal is present around the mobile device 20, the reception selector 28 places the first receivers 21, which receives the signal components including the detected interference wave, in the non-operation state, whereby it is possible to suppress the reception of a radio signal from the incoming direction of the interference wave and to facilitate the normal reception of the first transmission signal. Thereafter, the first transmission signal is retransmitted, whereby it is possible to further increase reliability of radio transmission of the first transmission signal from the on-vehicle unit 10 to the mobile device 20.

In a system, such as the keyless entry system 1, when the interference wave to the first transmission signal is not present around the mobile device 20, the higher the signal intensity of the first transmission signal, the easier the first transmission signal is normally received. The higher the signal intensity of the first transmission signal, the higher the reception electric field intensity detected by the electric field intensity detector 26. When the interference wave to the first transmission signal is present around the mobile device 20, the higher the signal intensity of the interference wave, the more difficult the first transmission signal is normally received. The higher the signal intensity of the interference wave, the higher the reception electric field intensity detected by the electric field intensity detector 26. For this reason, it is not possible to perform accurate determination by determination about the presence/absence of the interference wave to the first transmission signal using only information regarding whether or not the first transmission signal could be normally received.

However, in the keyless entry system 1 of this embodiment, the presence/absence of the interference wave to the first transmission signal is determined using two kinds of information regarding the reception electric field intensity detected by the electric field intensity detector 26 and whether or not the first transmission signal could be normally received. For this reason, it is possible to more accurately determine the presence/absence of the interference wave to the first transmission signal.

In the keyless entry system 1 of this embodiment, the first transmission signal is radio-transmitted using the first radio signal which is the radio signal having a frequency in the LF band, and the second transmission signal is radio-transmitted using the second radio signal which is the radio signal having a frequency in the UHF band. The radio signal having a frequency in the UHF band is significantly different in frequency from the radio signal having a frequency in the LF band, and is thus hardly affected by the interference wave to the radio signal having a frequency in the LF band. For this reason, even when the interference wave to the first transmission signal is present around the mobile device 20, it is possible to increase reliability of radio transmission of the second transmission signal from the on-vehicle unit 10 to the mobile device 20.

Although the embodiment of the invention has been described, the invention is not limited to the above-described embodiment, and may be appropriately changed without departing from the scope of the object of the invention.

For example, in the embodiment of the invention, the first transmission signal may be transmitted using a radio signal having a frequency other than an LF band insofar as a predetermined function can be realized. The third radio signal may be transmitted using a radio signal having a frequency other than a UHF band. The second transmission signal may be radio-transmitted using a radio signal having a frequency other than a UHF band insofar as it is possible to sufficiently reduce the influence of the interference wave to the first transmission signal.

In the embodiment of the invention, the electric field intensity detector 26 may detect the reception electric field intensity using a signal other than the detection signal of the first detector. For example, the electric field intensity detector 26 may be connected to the three first receivers 21 and may detect the reception electric field intensity based on the output signals of the three first receivers 21.

In the embodiment of the invention, vehicle operation other than locking and unlocking of the doors 41 may be performed through radio communication between the on-vehicle unit 10 and the mobile device 20. For example, turning on a welcome light for turning on a light if the user 50 approaches the vehicle 40, the start and stop of the engine of the vehicle 40, or the transmission of vehicle information of the vehicle 40, such as positional information, residual fuel amount information, or tire air pressure information, may be performed through radio communication between the on-vehicle unit 10 and the mobile device 20.

It should be understood by those skilled in the art that various modifications, combinations, sub-combinations and alterations may occur depending on design requirements and other factors insofar as they are within the scope of the appended claims of the equivalents thereof.

What is claimed is:

1. A keyless entry system for controlling on-vehicle equipment mounted in a vehicle via a wakeup signal and a command signal, the keyless entry system comprising:
an on-vehicle unit mounted in the vehicle; and
a mobile device configured to perform radio communication with the on-vehicle unit,
wherein the on-vehicle unit is configured to radio-transmit a first transmission signal including the wakeup signal and a second transmission signal associated with detection of an interference with the first transmission signal, the first transmission signal having a first frequency and the second transmission signal having a second frequency different from the first frequency, and
wherein the mobile device is configured to receive the first and second transmission signals from the on-vehicle device, the mobile device radio-transmitting a third transmission signal including the command signal to the on-vehicle unit when the first transmission signal has been normally received, and
wherein when the first transmission signal has not been normally received, the mobile device performs a detection of an interference wave to the first transmission signal in response to receiving the second transmission signal, and radio-transmits a fourth transmission signal for requesting the on-vehicle unit to retransmit the first transmission signal to the on-vehicle unit.

2. The keyless entry system according to claim 1, wherein the on-vehicle unit includes:
- a first transmitter configured to radio-transmit the first transmission signal;
- a second transmitter configured to radio-transmit the second transmission signal; and
- a third receiver configured to receive the third transmission signal and the fourth transmission signal, and wherein the mobile device includes:
- three first receivers configured to receive corresponding three signal components of the first transmission signal in three orthogonal directions;
- a second receiver configured to receive the second transmission signal;
- a third transmitter configured to radio-transmit the third transmission signal and the fourth transmission signal;
- an electric field intensity detector configured to detect, in response to the second transmission signal, an intensity of reception electric field of the three signal components received by the three first receivers;
- an interference wave detector configured to perform the detection of the interference wave to the signal components based on the intensity of the reception electric field detected by the electric field intensity detector;
- a reception selector configured to disable at least one of the first receivers which receives the signal component including the interference wave; and
- a controller configured to control the third transmitter, the electric field intensity detector, the interference wave detector, and the reception selector.

3. The keyless entry system according to claim 2, wherein the interference wave detector determines that an interference wave is present around the mobile device if the intensity of the reception electric field detected by the electric field intensity detector is equal to or greater than a predetermined value within a predetermined time period and the first transmission signal has not been normally received.

4. The keyless entry system according to claim 1, wherein the first transmission signal has the first frequency in a low frequency band between 30 kHz to 300 kHz, and the second transmission signal has the second frequency in an ultrahigh frequency band between 300 MHz to 3 GHz.

* * * * *